United States Patent
Gorrochategui

(12)
(10) Patent No.: US 6,485,401 B2
(45) Date of Patent: Nov. 26, 2002

(54) PROCESS FOR DRILLING OIL-HOLES IN CRANKSHAFTS

(75) Inventor: Gorka Gorrochategui, Elgoibar (ES)

(73) Assignee: Etxe-Tar, S.A. (ES)

( * ) Notice: Subject to any disclaimer, the term of this patent is extended or adjusted under 35 U.S.C. 154(b) by 59 days.

(21) Appl. No.: 09/756,669

(22) Filed: Jan. 9, 2001

(65) Prior Publication Data

US 2001/0008862 A1 Jul. 19, 2001

Related U.S. Application Data

(62) Division of application No. 09/360,256, filed on Jul. 23, 1999, now Pat. No. 6,203,478.

(30) Foreign Application Priority Data

Apr. 19, 1999 (ES) .................................. 9900797

(51) Int. Cl.[7] .......................... B23Q 3/157; B23B 35/00
(52) U.S. Cl. ........................................... 483/1; 408/1 R
(58) Field of Search .......................... 483/1, 14, 19, 483/31; 408/1 R; 409/131; 29/888.01, 888.02

(56) References Cited

U.S. PATENT DOCUMENTS

| | | | | |
|---|---|---|---|---|
| 3,806,691 A | * | 4/1974 | Roach | 219/69.11 |
| 4,629,378 A | * | 12/1986 | Parsons | 409/168 X |
| 4,637,107 A | * | 1/1987 | Romeu | 409/168 X |
| 4,655,652 A | * | 4/1987 | Schissler | 29/26 A |
| 4,656,726 A | * | 4/1987 | Suzuki et al. | 483/30 |
| 4,664,570 A | * | 5/1987 | Tsukiji et al. | 409/168 X |
| 4,712,282 A | * | 12/1987 | Romeu | 29/27 C |
| 5,172,464 A | * | 12/1992 | Kitamura et al. | 409/224 X |
| 5,391,850 A | * | 2/1995 | Mueller | 219/69.2 |
| 5,759,140 A | * | 6/1998 | Egbert | 408/46 X |
| 6,228,007 B1 | * | 5/2001 | Quak et al. | 408/51 |
| 6,287,245 B1 | * | 9/2001 | Randecker | 29/26 A |

FOREIGN PATENT DOCUMENTS

| | | | | |
|---|---|---|---|---|
| DE | 3036995 | * | 4/1982 | 408/46 |
| JP | 59-232707 | * | 5/1983 | 408/46 |
| JP | 59232707 | | 12/1984 | |
| JP | 7060517 | | 10/1986 | |
| JP | 61236464 | | 10/1986 | |
| JP | 61-236464 | * | 10/1986 | 408/46 |
| JP | 62-19308 | * | 1/1987 | 408/44 |
| JP | 62019308 | | 1/1987 | |

* cited by examiner

*Primary Examiner*—William Briggs
(74) *Attorney, Agent, or Firm*—Bierman, Muserlian and Lucas

(57) ABSTRACT

A process for drilling oil holes in a crankshaft at various positions lengthwise and widthwise about a longitudinal axis of the crankshaft, where the oil holes are perpendicular to and have angled directions with regards to the longitudinal axis. The process includes the sequential steps of placing the crankshaft in a horizontal position in a crankshaft holding unit and maintaining the crankshaft in a horizontal position through the drilling process. The holding unit is then rotated on a vertical axis until the crankshaft faces the drilling unit. The crankshaft is next rotated along the longitudinal axis of the crankshaft to position the crankshaft in a position for drilling a hole. The drill tool is then moved on a second and third axis until the drill tool is situated in order to drill the hole in the crankshaft.

6 Claims, 10 Drawing Sheets

PROCESS FOR DRILLING OIL-HOLES IN CRANKSHAFTS

CROSS REFERENCE TO RELATED APPLICATIONS

Figure 1:
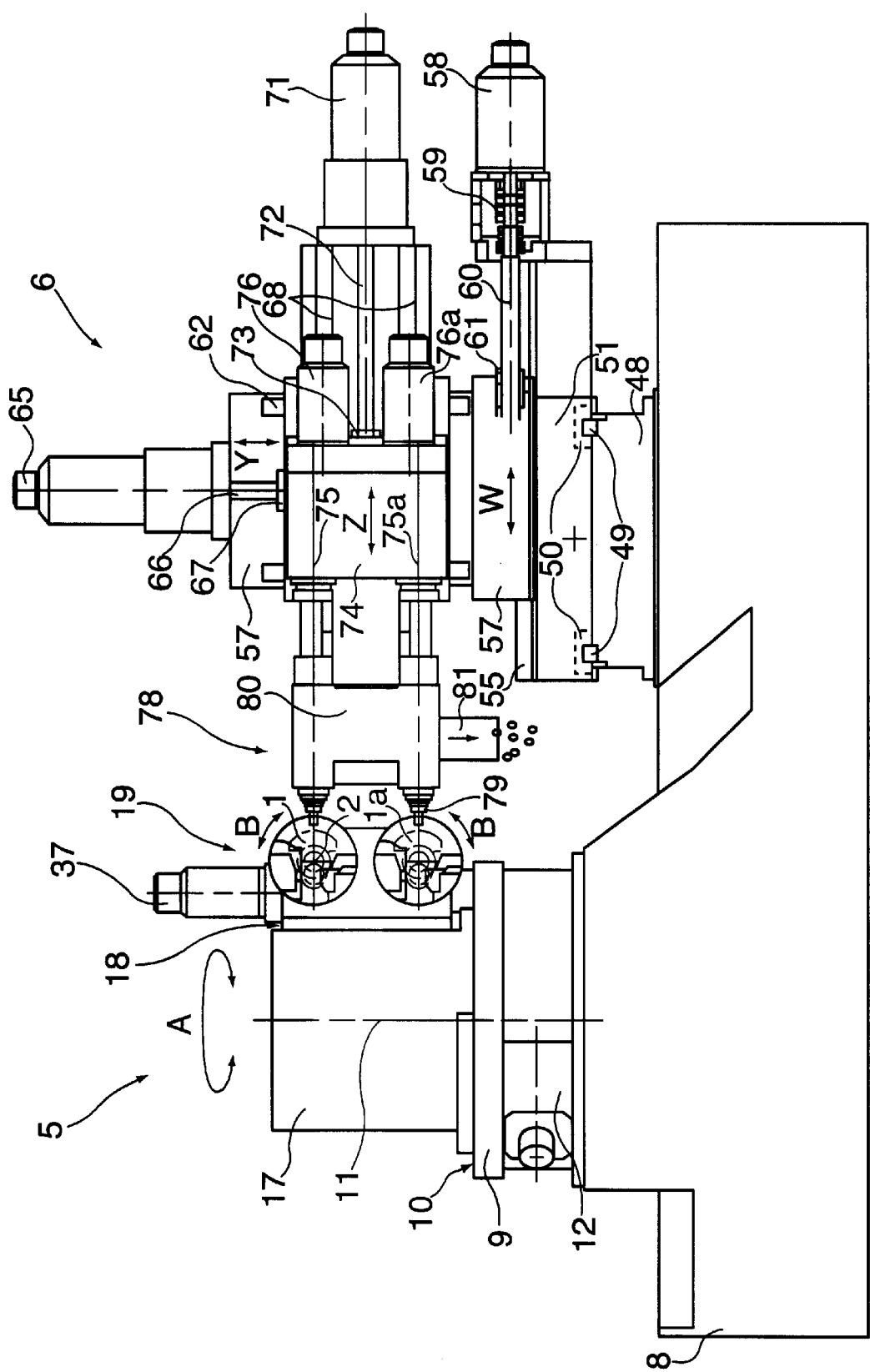

This application is a divisional application of U.S. patent application Ser. No. 09/360,256 filed Jul. 23, 1999 U.S. Pat. No. 6,203,478.

BACKGROUND OF THE INVENTION

This invention relates to a flexible process and machine for drilling oil-holes in different positions in a range of various types of crankshaft, in medium- or high-capacity production, for combustion engines (cars, . . . ).

Oil-holes may be situated in various positions lengthways and widthways on the longitudinal axis of a crankshaft, as well as in different positions around the circumference described when turning on this longitudinal axis. They may also be perpendicular or with various angles of inclination with respect to this longitudinal axis of the crankshaft.

Until the automotive industry concerned itself with the concept of flexibility, the machining described was undertaken by transfer units (multi-station lines), with each station drilling one of various holes. This solution has been valid in times of few changes in the dimension and shape of crankshafts, when an automobile engine was certain to have an extended life on the market. But now that changes are frequent, both machine and process need to be flexible to adapt to crankshafts with dimensional and geometrical modifications, as well as variations in the position/inclination of the oil-holes and also in the number of such holes. This adaptation needs to be rapid, simple and low-cost, due to the frequency of such a need.

There is another factor that has been changing in recent years: when a new automobile engine is launched onto the market, there are always doubts about the demand and any initial forecast may be miscalculated, either above or below the mark. For this reason, automobile manufacturers nowadays prefer production methods that begin with low-scale investment and production and later, if there is a growing response from the market, to gradually add new productive units the same as at the beginning. If the first unit is enough for a production volume of up to 50,000 pieces/year, they will need to add a second unit when there is a demand for up to 100,000/year, a third unit if there is a further demand and so on.

These factors cannot be tackled with multi-station transfer units, because they are not very flexible, nor do they admit progressive investment in line with escalating production brought on by increasing demand, since these are high-cost and high-production machines from the outset.

Furthermore, the diversity of oil-hole placement, explained previously, is not possible in traditional machining centres, with their X, Y and Z axes, at least in mid-high production level. Also, there is the problem of the additional W axis which is needed to position independently the drill guide bushings, since this fourth axis does not exist in traditional machining centres. Neither is there a special device to enable occasional automatic changing of the tool+guide bushing, and at other times just the bushing, because the tool is being used for the next drilling, but the bushing needs to be changed because it requires a different plane on the front end, to adapt it to the plane of the zone of the crankshaft it is resting on.

Because of all this, there is a need for a machine for drilling oil-holes in different positions and in a varied range of crankshafts, it needs to be flexible and at the same time a productive unit capable of being included in a production line in a quantity that increases as production increases.

There has been a previous attempt to meet this ambitious objective, but it has not produced the expected results, as it has important drawbacks which in medium-high production are a great inconvenience for an industry as demanding as the automotive industry. Below are some of the known drawbacks of this previous attempt, which for simplicity's sake will be referred to as "I A" (U.S. Pat. No. 5,759,140):

a) The machine has to be capable of working with gun drills which have a collector for the chips produced during the drilling, as well as with twist drills with no collector, and then the chips are scattered over the working area. The second alternative requires the layout of the working area to be such that there is no piling up of the chips on the crankshaft-bearing tools and on adjoining mechanisms, making it essential for the chips to be eliminated by falling through cleared areas and without any obstacle.

In the "I A" machine, the crankshafts are supported on a box-shaped rectangular frame, almost closed in on one side and with an opening on the other side for loading and unloading the crankshafts. This box-frame pivots on a horizontal axis supported on two opposing bearings. The pivoting is so that the longitudinal axes of the crankshafts situated in the box-frame can take various positions:

$1^{st}$ position: horizontal during the loading/unloading of the crankshafts.

$2^{nd}$ position: vertical, when drilling the holes perpendicular to the longitudinal axis of the crankshafts.

$3^{rd}$ position: inclined upwards when drilling the holes which are inclined in one direction with respect to the longitudinal axis of the crankshafts.

$4^{th}$ position: inclined downwards when drilling holes with the opposite inclination to the previous one.

The box-frame is almost closed in on one side and also receives the crankshafts, as well as the positioning and fixture mechanisms, together with the turning mechanisms of the crankshafts on their longitudinal axis and other necessary mechanisms, piping etc. All these elements are piled up in the box-frame. And in the $3^{rd}$ and $4^{th}$ positions, which are inclined, the chips from drills with twist drills fall directly and in great quantity onto the box-frame and all the mechanisms contained therein, and as they have no free-fall, they start blocking up crevices and anywhere else they can find to settle. This is a serious drawback, and in subsequent loading/unloading of crankshafts, the piling up of chips will cause malfunctions which are inadmissible in mid-high production.

In the summary of the invention which is presented further on, point $a_1$) describes its layout which is totally different to that of "I A", the way in which the drawbacks of "A I" are avoided and the lack of comparison in layout and results between "I A" and this invention, both in this aspect and in those which are set out afterwards.

b) The problem of chips scattering all over the work area, when drilling with twist drills, is avoided when working with gun drills, because they have a chips collector in the shape of a collecting bin joined to the outlet pipe. But with "I A" there now arises another problem and serious at that. The collecting bin and the outlet pipe together are fairly bulky, and if the chips are of steel, they need to be very bulky, since steel chips are sizeable and difficult to evacuate. And the external configuration of this apparatus collides with the crankshaft-bearing box-frame and with its piled up mechanisms. This occurs in the $3^{rd}$ and $4^{th}$ positions, both inclined, as described in a). And to avoid this collision, one has to make do with combined collecting bin/outlet pipe apparatuses that are insufficient for their function, giving rise to obstructions in the evacuation of chips, continual stoppages and maintenance requirements that are unacceptable in mid-high production.

See $b_1$) for the totally different layout of this invention that avoids this problem inherent in "I A".

c) The pivoting on two bearings of the box-frame which supports the crankshafts in "I A" leaves this device supported only on its centrally-situated pivotal axis and the rest is hanging free. This is too much to be hanging free. Crankshafts are lengthy pieces, and at each end are the referencing and support elements, which make the sub-unit even longer and they can give some 500–600 mm to the right and to the left of the pivoting, with no additional support but for the pivotal axis. The other side of the rectangle of the box-frame is also rather large and the crankshafts, together with all the mechanisms in the box-frame make up a great weight, forming an enormous and heavy mobile sub-unit, which also bears the drilling forces. This situation is not helped by just the pivotal axis, even by adding braking to the pivotal axis, as the zones hanging free are some distance away. In this respect, the inclinations of the crankshafts for holes to be drilled at particular angles to the longitudinal axis of the crankshaft are not precise, as they are affected by the imprecision caused by the zones hanging free, lacking any support. In addition, the zones hanging free, acting as a counterweight, do not favour precision in inclined positioning power-controlled by the pivoting activator.

See $c_1$) for how this invention, with a totally different layout to that of "I A" avoids these drawbacks.

d) When turning of the crankshafts on their respective longitudinal axes so that the circumferential position for beginning the drilling of the next hole is aligned with the corresponding tool, is effected by "I A" with transmission by a toothed belt connected to three toothed pulleys, one of which is on the servomotor and the other two on the shafts turning the two crankshafts. The transmission has a circuit in the shape of an isosceles triangle, with pulleys at the three vertices. This layout has the following drawbacks:

The toothed belt, as a result of long-term use, becomes longer and this produces gaps in the gearing with the toothed pulleys, giving rise to defects in the precise circumferential positioning of the crankshafts when turning on their longitudinal axes.

The toothed belts have a limited life and tend to break, requiring their periodical replacement. This gives rise to maintenance problems, because the transmission is situated in an area with difficult access, as it is surrounded by a large number of mechanisms that get in the way.

The transmission, with its belt, its three toothed pulleys, protective covering and servomotor form a bulky sub-unit which aggravates the problems of space produced by the box-frame which houses the crankshafts and the rest of the mechanisms. This makes maintenance access to these mechanisms difficult. It also creates an obstruction in the box-frame sub-unit, affecting the elimination of chips (see point a).

There is a further problem. With the drawbacks already mentioned, the layout is applicable to two crankshafts per cycle. But there are further problems if there are, for example, three crankshafts, due to the difficulty of belt transmission between one activating axis (the servomotor) and three activated axes in a line.

See $d_1$) for how this invention has none of these drawbacks, due to a totally different layout.

e) The W axis of the machining module bears the guide bushings of the tools. When using gun drills, the bushings rest with spring pressure on the area of the crankshaft where drilling is begun, so that the chips and pressure coolant can be evacuated. With twist drills, the bushings are placed a little apart from this area, so that the chips and coolant can escape through this small space. The W axis runs parallel to the Z axis (the tool feed) of the machining module, and is activated independently, so that first the W axis moves into place until the bushings are situated in their correct positions, then the Z axis moves into place to begin drilling, while W remains static. In the "I A" machine, the W axis is in the shape of a quill unit, emerging from the body carrying the drill bushings and positioning itself in between the two bushings. This layout has the following drawbacks:

Positioning quill unit between the two bushings is only possible when two crankshafts per cycle are being drilled. But if only one or more than two crankshafts are being drilled, as the machining module has to carry one or more than two bushings, the position of the quill with respect to the bushings is not balanced, resulting in problems related to parts hanging free, imbalances and various other complications affecting the stability of the guide bushings during drilling and consequently the precise positioning of the holes.

As the quill unit is mounted in the body carrying the guide bushings, when Z moves while drilling, this simultaneously moves W forward. But since, as was previously mentioned, W with its guide bushings has to remain static during the drilling process, this means that the independent activation of W has to move back while Z moves forward. Thus, the relative position between the crankshafts and their respective guide bushings is unchanged. But this combination of Z moving forward while W moves back requires an interpolation between the two servoactivators to be programmed, an interpolation that complicates programming. As this is supposed to be a flexible machine and therefore suitable for drilling different kinds of crankshaft, any complication as described above is counter-productive in terms of maximum operative simplicity.

The quill unit-shaped W axis gives rise to some overhang between the support carrying the guide bushings and the seat of the quill unit on the body carrying the bushings. With the option of drilling with gun drills, the collecting bin with the outlet pipe, designed to collect the chips, is also connected to the support carrying the guide bushings. This makes up a bulky and weighty sub-unit with a lot of overhang with respect to the seating of the quill unit, and it does not have the strength and stability needed to support such a sub-unit. This poses snags and drawbacks of application, even when two crankshafts per cycle are being drilled and the quill unit is between the two bushings. But these drawbacks are intensified when drilling just one or more than two crankshafts per cycle: the position of the quill unit with respect to the bushings adds further problems (see the first drawback in e).

With all these problems, it is evident that the quill unit is not a good solution for the W axis. See $e_1$) for how this invention eliminates all these problems with an independent module instead of a quill unit mounted in the bushings unit.

f) In mid-high production, the loading and unloading of pieces into the machine is of relevant importance, and more so with pieces of certain weight and volume, as is the case with crankshafts, particularly if several pieces per cycle are being machined. Usually automatic loading/unloading is used, either with handling gantries or similar systems. For this reason, the loading/unloading station needs to be endowed with suitable characteristics, and even extra options in order to meet special circumstances which arise in mid-high production. The aim is to be able to favourably organise such an important aspect, whatever the circumstances attached to each particular application. The flexibility of a machine exists for a reason—to be able to adapt to a whole range of situations. The "I A" machine does not offer these suitable characteristics or additional options. The loading/unloading station is inflexible and precarious. It is inflexible for automatic as well as manual loading/unloading. This involves hazards for the operator in manual loading/unloading if the automatic function has had to be stopped temporarily because of a breakdown or for maintenance. As these machines are situated in a line with various productive units, attended by a lengthy crankshaft transport and handling system, working simultaneously with a number of arms on their respective production units, if there is a malfunction at one of these stations (for example the grip clamps for handling the crankshafts), then the automatic load/unload function has to be disabled, yet the overall transport and handling system is still functioning at all the stations, and the operator manually loading and unloading at the affected station faces problems and even hazards due to the difficulty of establishing complete safety conditions because the overall system is still operating above.

See $f_1$) for how this invention offers ideal characteristics and extra options for loading/unloading, based on a totally different layout.

g) For the automatic changing of tools+their guide bushings, or just the bushings when applicable, the "I A" machine requires an additional "U" axis which involves columns, a gantry, a module for the elements to be changed, together with their endless belt-driven mechanisms, as well as other complementary mechanisms. All this involves considerable bulk and which needs to fit and move in the hazardous gap between the machining module and the crankshaft-carrying sub-unit. So much so that this sub-unit means placing the box-frame with all it contains (crankshafts, fixtures, etc.) vertically, otherwise there would not be room to move the U axis that automatically changes the tool etc. This is a solution that is complicated, a costly investment, awkward and not at all ideal for a flexible machine.

See $g_1$) for a completely new solution with this invention, which avoids the drawbacks of "I A".

h) For the purposes of productivity with a machine devoted to mid-high production, if the aim is to achieve the required flexibility, further options are desirable, such as:

The machine needs two stations, one for machining and the other for loading/unloading the pieces. Thus one can load/unload at one station, while machining at the other, thereby saving all the time spent handling, loading/unloading and supporting the pieces, and so increasing productivity, with only a slightly higher investment, because of the duplication of fixtures.

Similarly, one could establish cells, with two machining modules facing each other and a centrally-situated sub-unit carrying the crankshafts and their tools, also double-sided. This would be like a "mirror" cell. It would duplicate production, but the investment would be less than double.

These options are impossible with "I A", while thanks to its totally different overall layout, this invention, as can be seen in $h_1$) and in the description and plans, does make them possible.

i) A serious problem in mid-high production is the lack of direct and easy access to all parts of the machine whenever adjustment, checking or maintenance is required. This demands the intelligent laying out of all the mechanisms/sub-units/units. This is not the case with "I A", which is an agglomeration of parts which get in the way of each other.

On the other hand, see $i_1$) and the plans for how this invention is uncluttered and accessible from all sides thanks to its layout, which has eliminated every unnecessary complication and agglomeration.

EXPLANATION OF THE INVENTION

Depending on the production level, this invention can be manufactured or laid out to drill one, two or more crankshafts per cycle. The plans show the layout for two crankshafts, but this is by way of example, the options for more crankshafts being equally as valid. There now follows a summary of the various characteristics of the invention and the novel layout which eliminates the drawbacks and/or deficits of "I A" and the advantages this invention presents. To aid understanding, paragraphs a), b), c) etc. indicating the properties of "I A" are listed $a_1$), $b_1$), $c_1$) etc. in the explanation of this invention, as follows:

$a_1$) During the loading/unloading and supporting of the crankshafts and also during all pre-drilling positioning sequences as well as the drilling process, in other words, the whole time the crankshafts are in the machine, their longitudinal axes remain inalterably horizontal (unlike "I A", with its different inclinations to the horizontal). One crankshaft is situated above another, with a suitable distance between them. This is an improvement on the "I A" box-frame with its pivoting, in fact the layout is completely different; the work area is uncluttered, with nothing obstructing the free fall of the chips produced in the drilling process. With no chips piling up on the support elements for the crankshafts, there is no risk of malfunction in automatic loading/unloading.

$b_1$) In the absence of the "I A" box-frame with its pivoting for different inclinations to the horizontal, the chips collecting-bin with outlet pipe (when working with gun drilling) does not collide with the crankshaft support elements and neighbouring mechanisms. Thus a collecting-bin and outlet pipe of the required voluminous size can be used, especially when drilling steel crankshafts.

$c_1$) In the absence of a box-frame and its pivoting, there are no overhanging parts, nor braking on the pivoting shaft, and no great unsupported mass/weight or negative repercussions in precision arising from such negative properties.

One of the principal novelties, which has eliminated the drawbacks in c) and other paragraphs also, is based on a horizontally-faced turntable with a vertical shaft, which completely supports the sub-unit carrying the crankshafts. This turntable with vertical shaft enables the sub-unit carrying the various crankshafts, situated parallel to each other and with their longitudinal axes always in a horizontal position, to rotate to various inclinations in a plane horizontal to the Z axis (the tool feed) of the machining module, in order to drill the holes which are angled to the longitudinal axis of the crankshafts. This completely different solution is not particularly complex, is devoid of drawbacks and has all the desirable advantages, with a positive effect on point $c_1$) as well as all the subsequent points.

The vertical shaft rotary table is servoactivated by a servomotor and a wormwheel mechanism, with zero play, with 360,000 programmable positions guaranteeing strict precision in drill positioning, both for holes angled to the longitudinal axes of the crankshafts, which require positioning of the table at ±N°, as well as for non-angled holes at right angles to the longitudinal axes, which call for positioning of the table at 0°. The rest of the positionings are −90°, −180° and −270°, to achieve the combinations shown in $f_1$).

$d_1$) The layout for the rotating of the crankshafts on their horizontal axes, which in "I A" presents many serious drawbacks, in this invention is completely different and with no drawbacks, as there is no toothed belt, cogged pulleys or protective covering. The servomotor, by means of a coupling, transmits its rotation to a worm, which engages with its wheel or gear, the latter being mounted on the shaft carrying the upper crankshaft. But synchronised and exactly equal rotations are transmitted simultaneously to the crankshafts situated below the upper one, with equal worms and wheels, and by means of a multiple drive-shaft going from top to bottom of the layout. The drive-shaft, worms and wheels are precise and with zero play, providing high-precision positioning for all the crankshafts. The servo-action is provided with a positional measurement encoder which guarantees high precision.

This novel layout has a further great advantage: the mechanisms in use do not clutter up the work area. The servomotor (with its vertical axis) is above this area, and higher than the crankshaft-carrying tools.

The rest of the simplified compact mechanism is behind the tools, between them and the panel supporting them, completely separate and apart from the drilling area and the dropping of chips. Thus all the chips can drop free with no obstacles.

Another advantage: if instead of two crankshafts per cycle, there is only one or more than two, this layout is valid: with one crankshaft, the servomotor activates the worm directly and with more than two, one only has to lengthen the multiple drive-shaft.

$e_1$) The W axis carrying the guide brushings of the tools moves on a module with linear guides and runners, a completely different layout which is incomparably superior to the "I A" quill unit device. The direction of movement is parallel to Z and it operates independently. In addition, the module is independent of the bushings-bearing unit which moves in accordance with the Z axis. The drawbacks eliminated and the advantages of the invention are as follows:

This system and the strength of the module makes it valid for carrying the guide bushings of the tools, whether for one/two/or more than two crankshafts per cycle, because with the module the problem of positioning the quill unit with respect to the bushings is eliminated, since the module is independent of the unit carrying the bushings. Overhang, imbalance etc is thus avoided.

The independence of the W axis with respect to the bushings unit which moves in accordance with the Z axis, eliminates the programming by interpolation of the Z and W axes. Thus, W moves to where it has to be statically situated, then Z moves to drill, but as this move does not take W with it, as in the "I A" layout, W does not need to move back (through interpolation) to counteract the undesirable pull exerted by the advance of Z in "I A". This is a simpler and faster programme.

The module has more than enough strength to support not only the guide-bushings, but also the bulky and heavy collector-bin with outlet pipe sub-unit, which is needed to collect the chips with the gun drill option, something which is even more of an advantage with steel crankshafts, which need this sub-unit to be very bulky and therefore heavy.

$f_1$) In the plans of this invention it can be seen that as a result of the novel layout of the horizontally-faced turntable with a vertical shaft, the machine has four station options (each one 90°) which permit the following combinations (see FIG. 4e for a clearer view):

Station 1 drilling and station 2 automatic loading/unloading.

Station 1 drilling and station 3 automatic loading/unloading.

Station 1 drilling, station 2 automatic loading/unloading and station 3 manual loading/unloading.

Station 1 drilling, station 2 manual loading/unloading and station 3 automatic loading/unloading.

(*) Station 1 drilling and station 3 automatic loading/unloading, carried out while drilling, in other words saving time in handling, loading/unloading and fitting the crankshafts, thus increasing production. This requires duplicating the crankshaft fitting tools.

(*) Stations 1 and 3 drilling with two modules facing each other and with duplication of crankshaft fitting tools, forming a "mirror" cell, and stations 2 and 4 automatic loading/unloading. This doubles production with an investment of less than double.

These six possible combinations, and the fact of having four stations to achieve them, show that this invention's layout and results are incomparable with "I A", which has just one hazardous station and only one function mode in these aspects.

Furthermore, in the manual loading/unloading mode (used in tests or when automatic mode has been temporarily disabled due to a malfunction or for maintenance), handling is much more effortless and convenient with the two crankshafts, one over the other, nearby and parallel to the operators chest height, in comparison to "I A" which calls for placing and removing the crankshafts in/from a box-frame situated horizontally, too high and far away from the operator's chest height, and this means he has to work with stretched arms to carry out inconveniently tiring tasks which can injure the spinal column, even more so if we take the weight and volume of the crankshafts into account. And although these are temporary circumstances, they happen fairly frequently, which is why the best and most convenient solution is important.

The manual loading/unloading station, being independent and a certain distance away from the automatic loading/unloading station, allows all safety measures demanded by the automobile industry to be implanted, with a view to eliminating hazards for the operator (security gate, etc.), because he is not standing underneath the general system of transport and automatic handling of crankshafts, which carries on functioning overhead, in the case of a line with various production units served by this general system.

These are aspects which show that the layout of this invention cannot be compared with "I A" and that the results are vastly superior.

$g_1$) The plans of the invention and their description show that the system for automatic changing of the tools+their guide-bushings, or just the bushings when applicable, makes good use of the movement of the X axis to take the machining module to the area on the right which contains the store of elements to be changed, and similarly, the movements of the Z and W axes to extract-introduce these elements out of/into the bushings and take/leave them in the store. This constitutes maximum simplicity: the three axes, X, Z and W, which are necessary for the machining module to carry out its positioning and drilling approach, also serve for the automatic changing of tools and guide-bushings. Thus, every awkward and complex aspect of "I A" is eliminated: columns, gantry, module for the elements to be changed, their activation by endless belt, etc. This not only eliminates complications and monetary investment, it also eliminates an enormous bulk which is such a problem with "I A".

$h_1$) For the purposes of productivity and its relationship with economic investment, the last two combinations marked with an asterisk (*) in $f_1$) show that this invention has additional possibilities not found in "I A". This increases flexibility as well as the scope of application.

$i_1$) One only has to analyse the plans to realise that the direct and convenient accessibility of all parts of the invention, for adjustment, checking and maintenance, has been achieved, thanks to the intelligent layout of all mechanisms/sub-units/units, with the elimination of unnecessary complications and cluttering which cause such problems with "I A".

BRIEF DESCRIPTION OF PLANS

This invention's differences from previous machines, the elimination of their drawbacks and/or deficits, as well as its advantages, will be evident in the plans which are attached (with a detailed description to follow):

FIG. 1—A lateral view of the invention, showing on the left the horizontally-faced rotary table with vertical shaft, and above, the sub-unit carrying the crankshafts; to the right, the machining module showing the Z and W axes longitudinally and the Y axis vertically.

Figure 2:
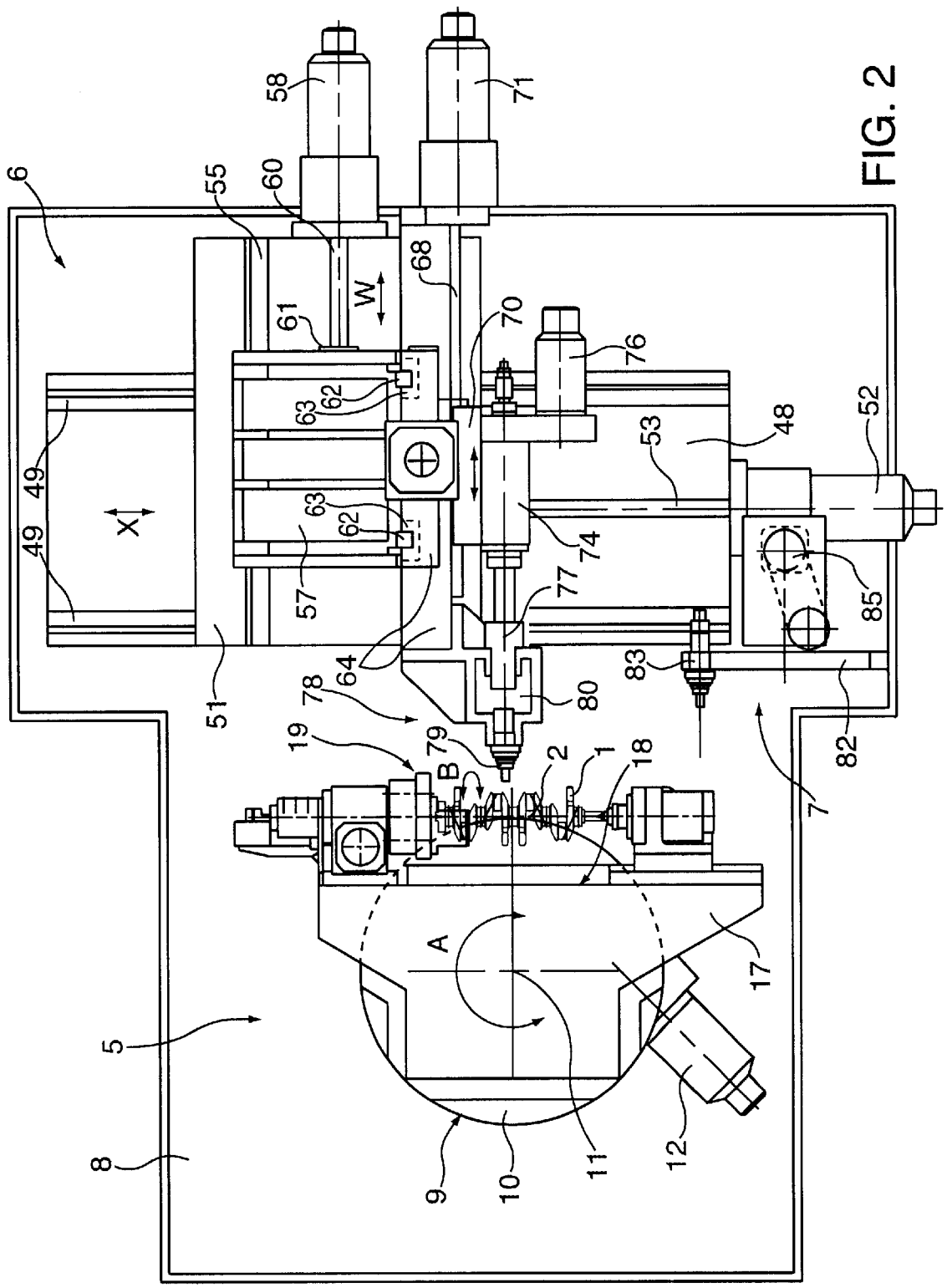

FIG. 2—A general view (of FIG. 1).

Figure 3A:
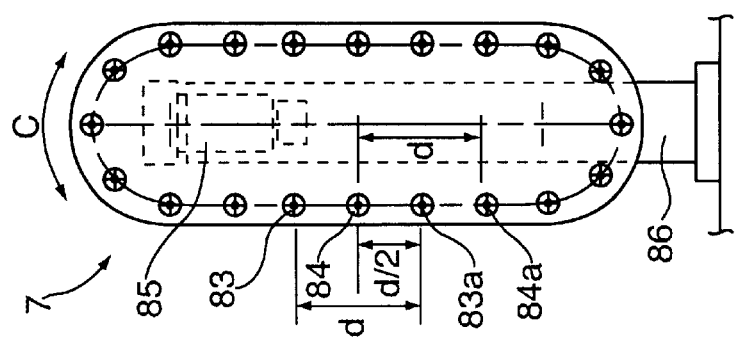
Figure 3:
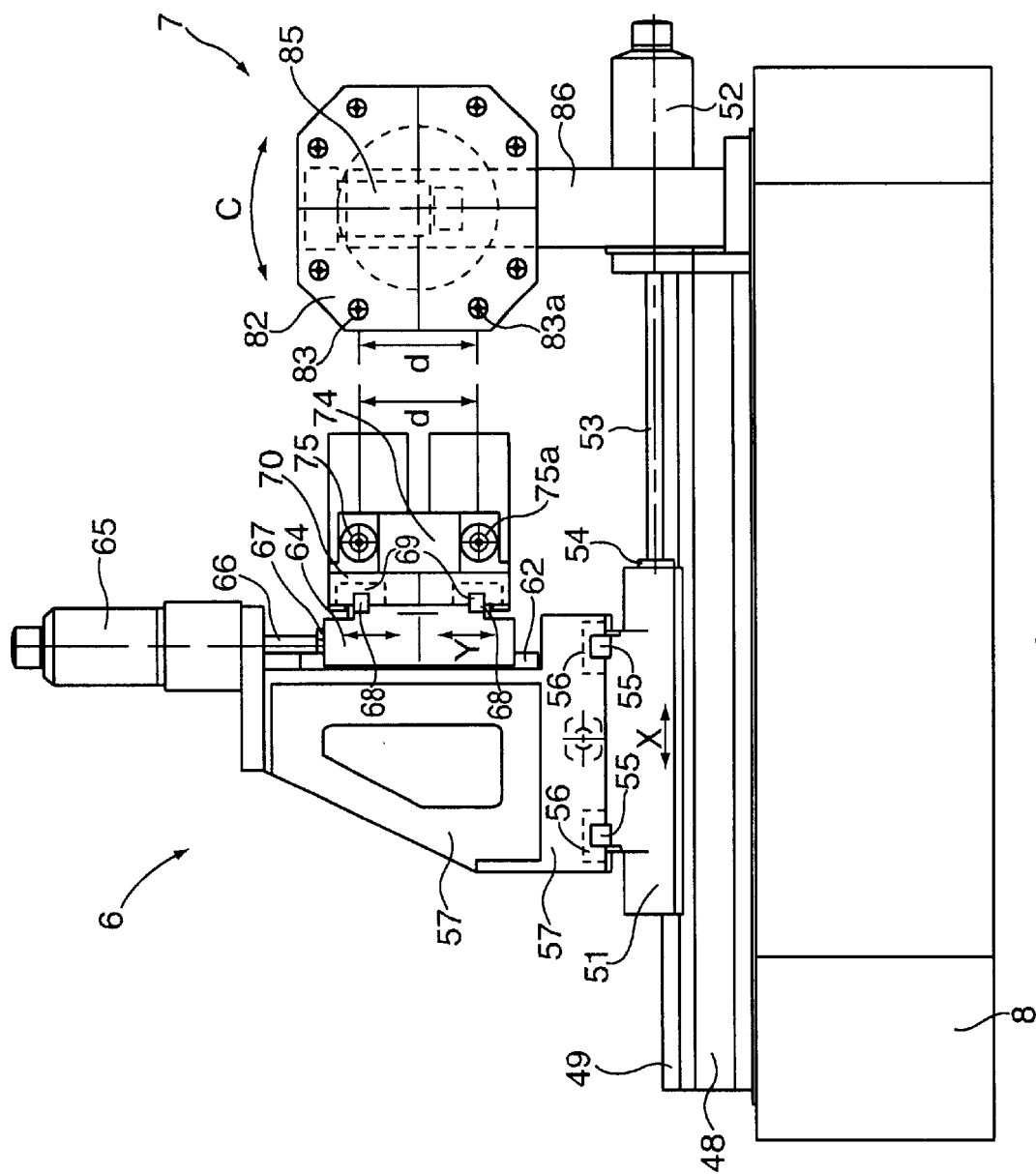

FIG. 3—A frontal view of the machining module (6), tools and guide-bushing magazine (7), replacing this magazine by a chain magazine in FIG. 3a.

Figure 4A:
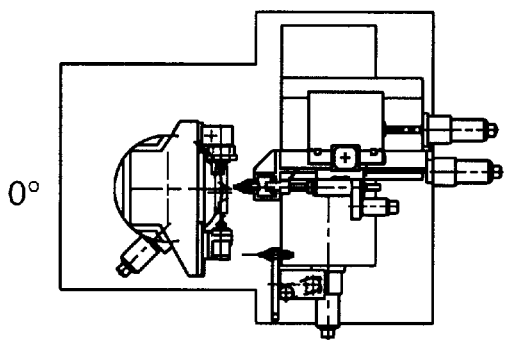

FIG. 4a—A view with the vertical shaft rotary table in 0° position, for drilling holes at right-angles to the longitudinal axes of the crankshafts.

Figure 4B:
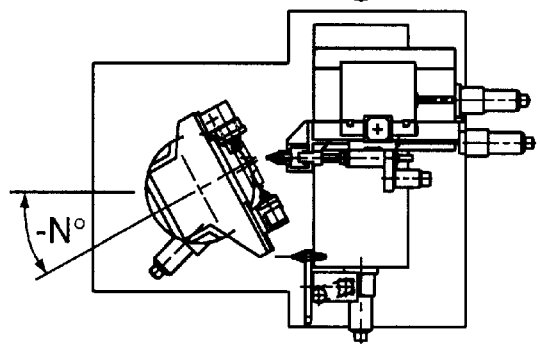
Figure 4C:
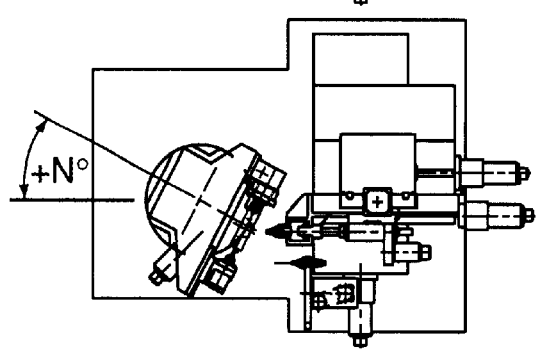

FIG. 4b—A view with the vertical shaft rotary table in the −N° position for drilling holes at an angle (in one direction) to the longitudinal axes of the crankshafts FIG. 4c—A similar view to FIG. 4b but with the vertical shaft rotary table in the +N° position for drilling holes at an angle in the opposite direction to the previous plan.

Figure 4D:
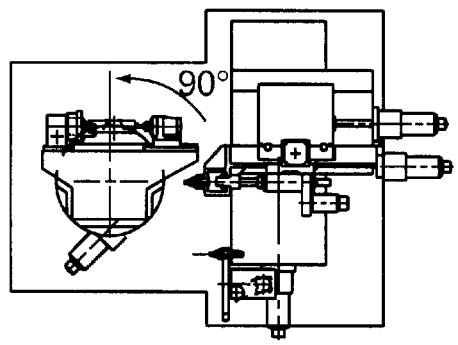

FIG. 4d—A view with the vertical shaft rotary table in the −90° position as a loading/unloading station (manual or automatic).

Figure 4E:
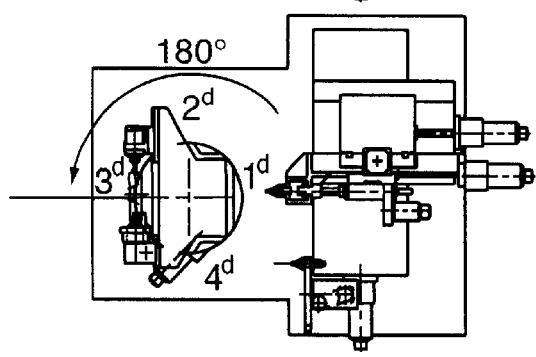

FIG. 4e—A view similar to 4d, but in the −180° position, as another option for a loading/unloading station (manual or automatic, but the other way round to the option chosen in FIG. 4d). Stations 1, 2, 3 and 4 are shown here with 90° between them.

Figure 5A:
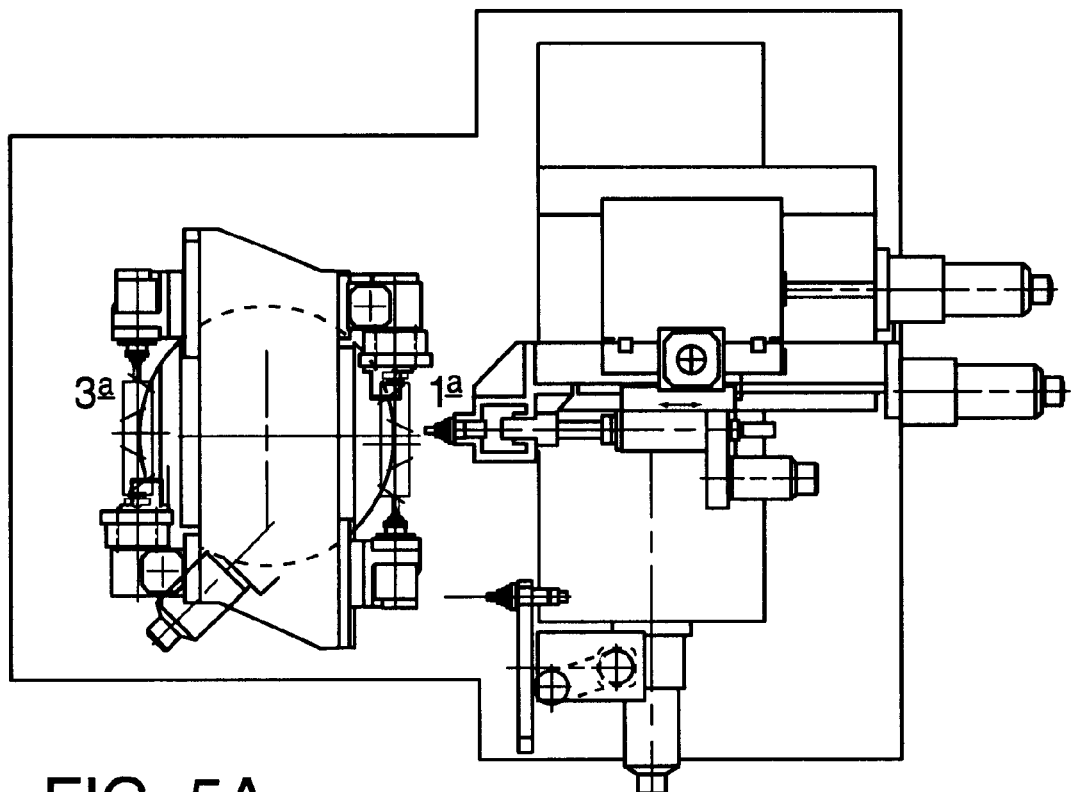

FIG. 5a—A view showing the special feature with duplication of the crankshaft support devices. See the first asterisk (*) in $f_1$), also in $h_1$).

Figure 5B:
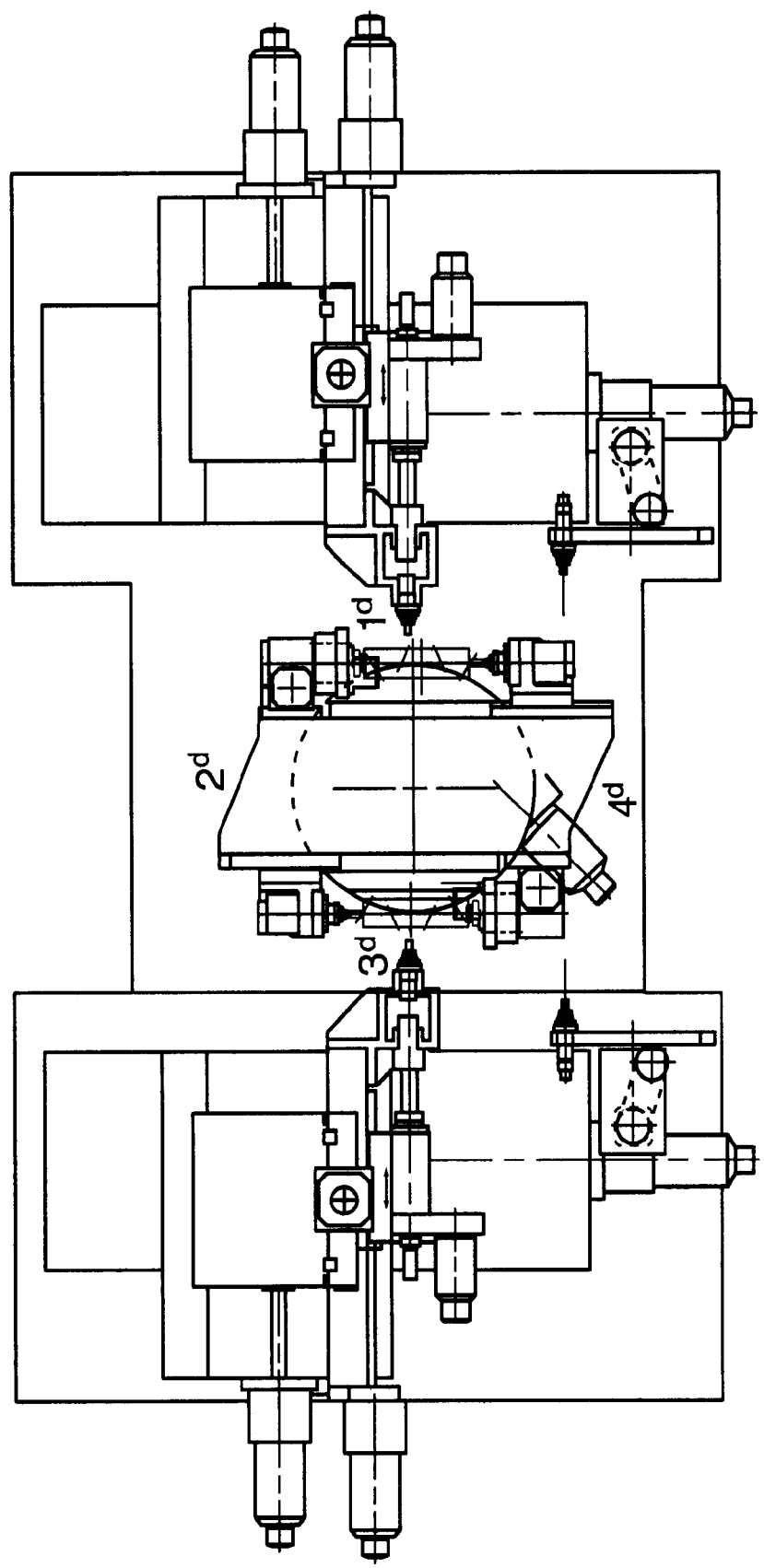

FIG. 5b—A view showing the special feature with duplication of the crankshaft support devices as well as the machining modules ("mirror" cell). See the second asterisk (*) in $f_1$), also in $h_1$).

Figure 6A:
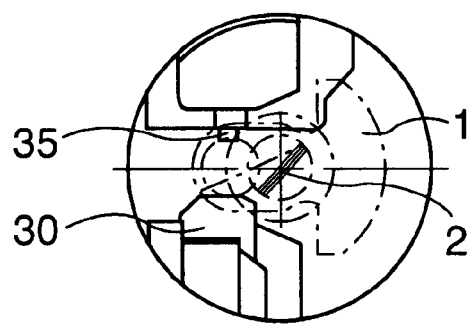
Figure 6:
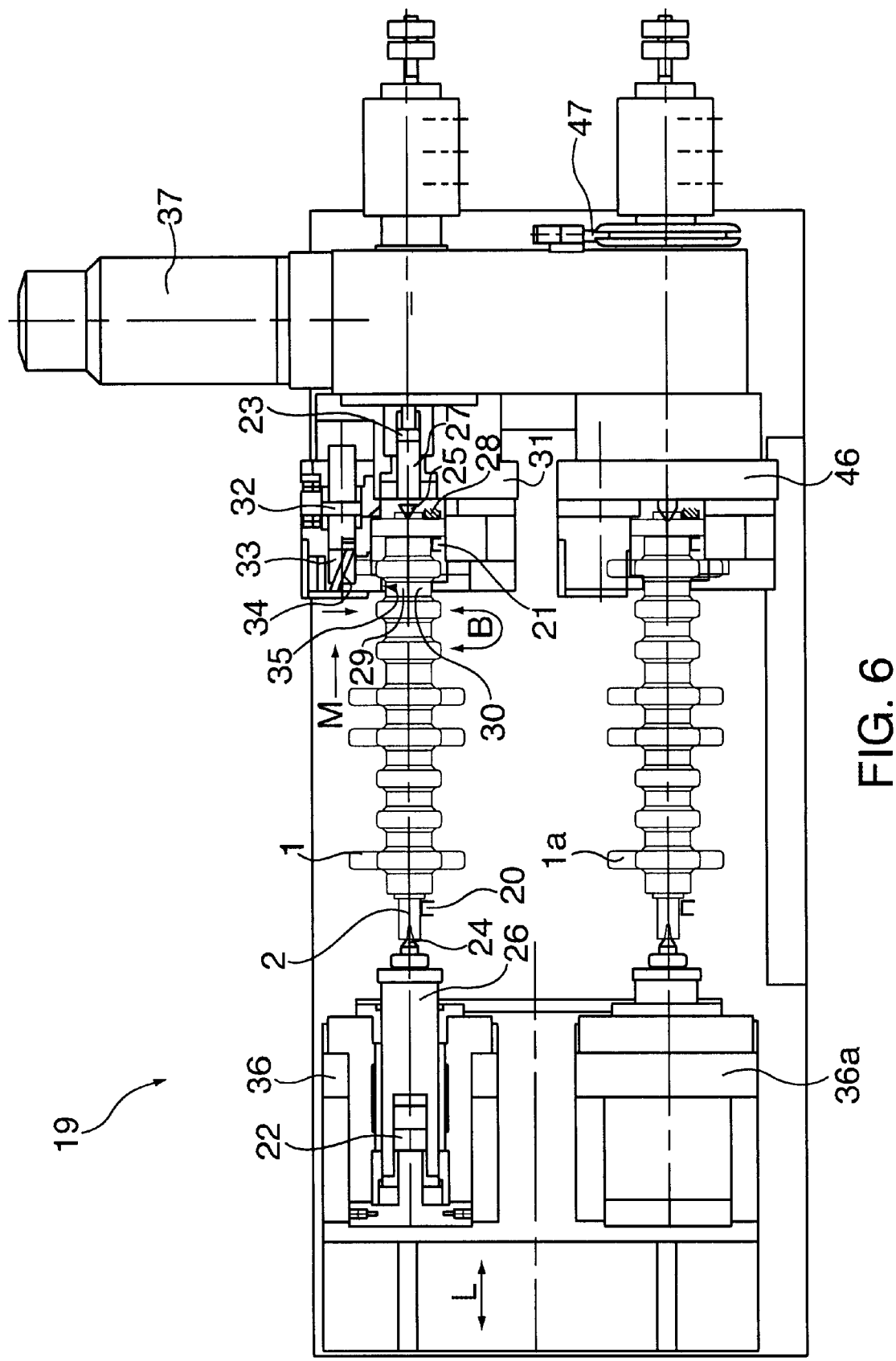

FIG. 6—A frontal view/half section of the crankshaft support devices.

FIG. 6a—A partial view of "M" in FIG. 6.

Figure 7:
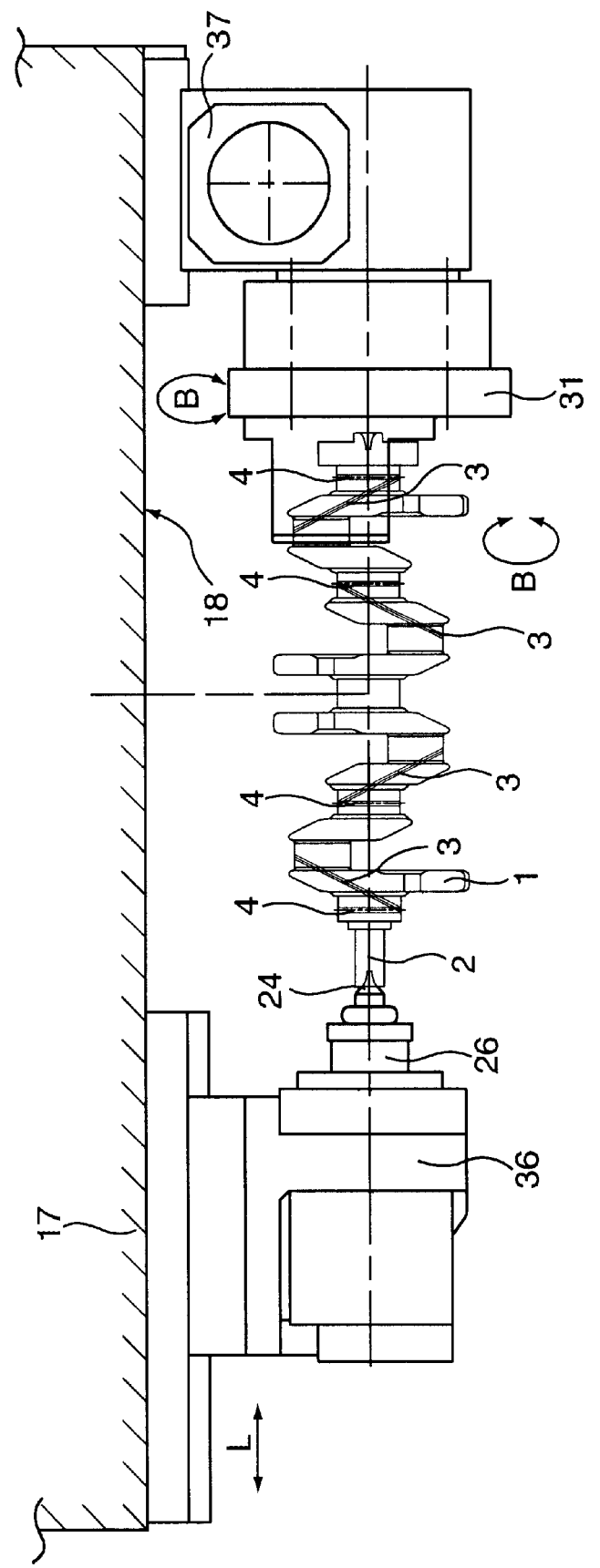

FIG. 7—An on-site view of FIG. 6.

Figure 8:
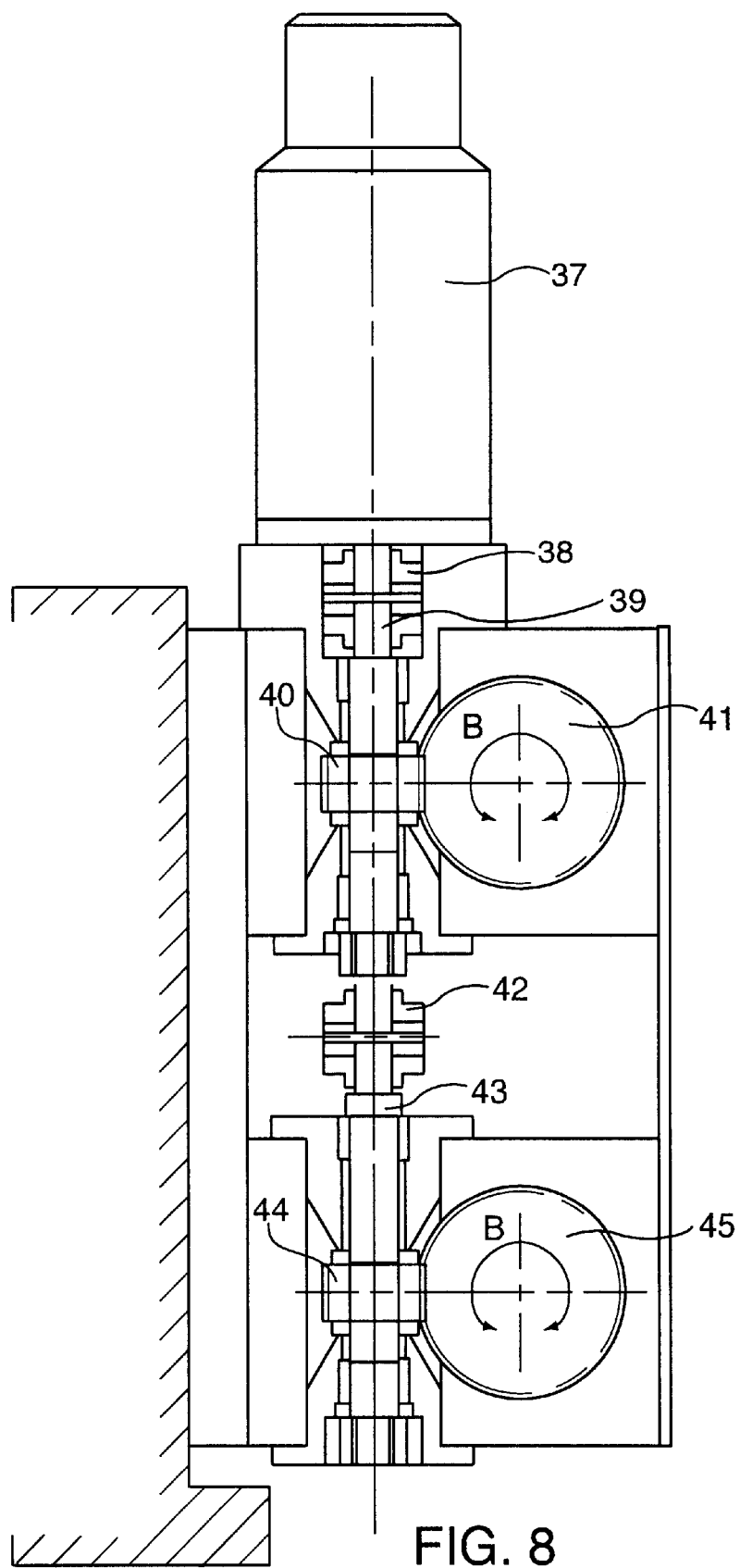

FIG. 8—A section of the rotation activation device (B) of the crankshafts on their longitudinal axis. This is the layout which is shown on the right in FIG. 6, with the vertical servodrive (37).

Figure 9:
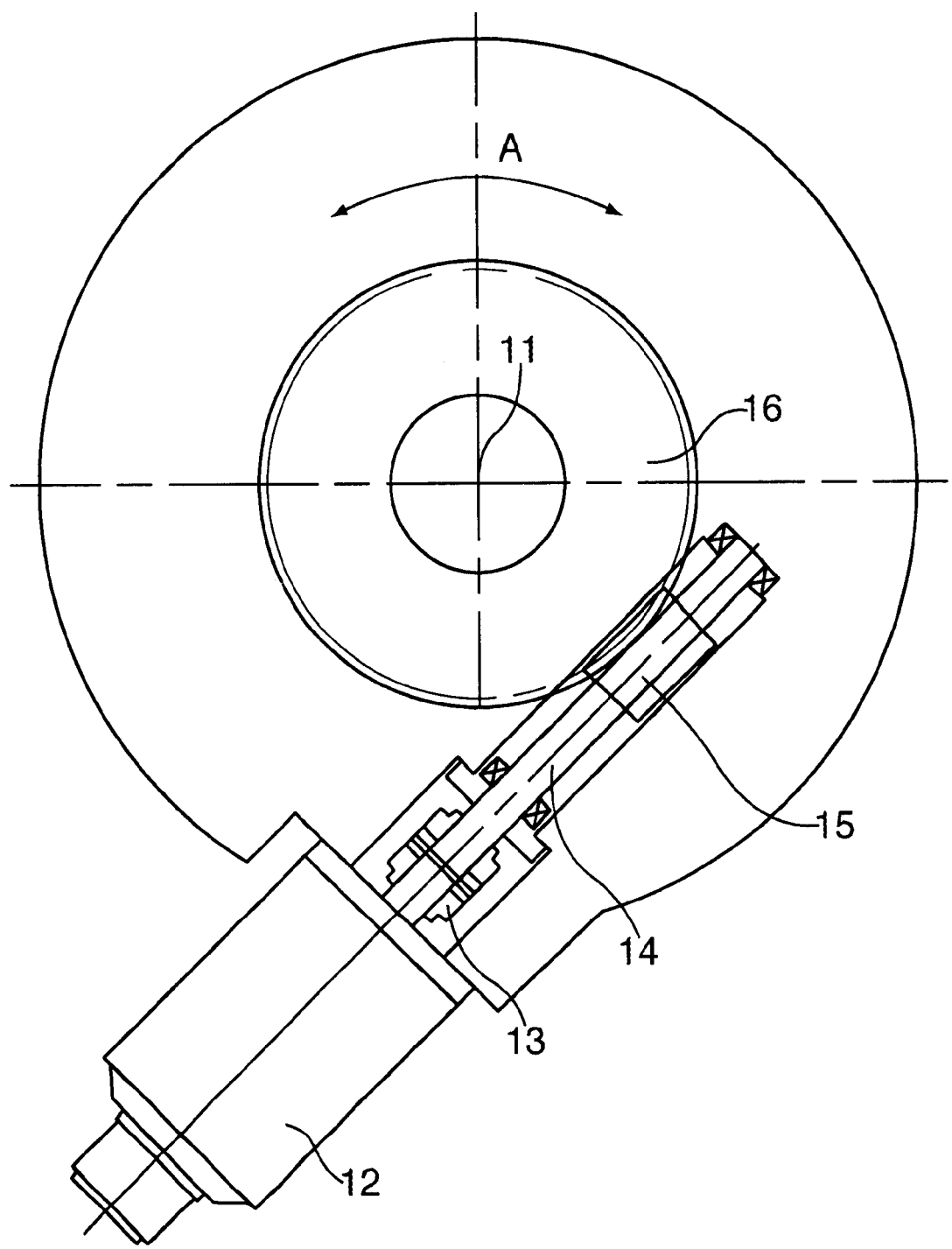

FIG. 9—A section of the horizontally-faced rotary table device, with rotation as shown by A, with vertical shaft (11).

DETAILED DESCRIPTION OF OPTIMUM FUNCTIONING

As is shown in the plans and in the description that follows, this invention refers to "a flexible process and machine for drilling oil-holes in different positions in a range of various types of crankshaft".

The crankshaft (1) has a longitudinal axis (2), FIGS. 1, 2 and 6. For functioning in a combustion engine, it needs various different oil-holes, some inclined (3) at different angles, FIG. 7 and others (4) at right angles to the longitudinal axis. These holes have different positions along and around the longitudinal axis (2) and also have different positionings in the circumference described by the crankshaft when it revolves on its longitudinal axis (2). When the shape and/or dimensions of the crankshaft are changed, or when the engine's cylinder capacity is changed, very often it is necessary to modify the longitudinal, transverse (widthways) and circumferential positionings, and also the angling of the oil-holes. There may also be a variation in the number of holes to drill, and all this calls for a flexible process and machine in order to adapt quickly and conveniently to each change, thereby guaranteeing the required precision and production level.

The machine is subdivided into three main units:

The unit (5) bearing the crankshafts, shown to the left in FIGS. 1 and 2. It includes two revolving parts, one (A), a horizontally-faced rotary table with a vertical shaft, and the other (B) the revolving of the crankshafts on their longitudinal axis (2).

The machining module (6) which carries the tools and guide bushings for drilling the oil-holes. FIGS. 1 and 2 show this on the right and FIG. 3 on the left. It includes displacements on the X, Y, Z and W axes.

The supply unit (7) of tools and their guide bushings, which functions in combination with the system for the automatic changeover of these elements. The supply unit revolves (C).

The (A), (B) and (C) revolutions and the displacements on the X, Y, Z and W axes are servo-activated by servomotors, which governed and checked by the installed numerical control and software, give the production unit the required flexibility, which cannot be achieved with multi-station transfer lines. This flexibility eliminates costly and inconvenient conversions of the machine. Each servomotor is provided with its own measurement encoder, which ensures the precision of all positionings.

The machining module (6) and the supply unit (7) of tools and guide bushings are attached to the surface of the body (8), which has a plateau supporting the crankshaft support unit (5).

The crankshaft support unit (5) comprises: a rotary table (9) with horizontal face (10) and vertical shaft (11), FIGS. 1 and 2. The rotary table is activated by a servomotor (12), FIG. 9, via a coupling (13) and a shaft (14), activating the worm (15), which engages with the wheel (16) of the rotary table (9) revolving (A) with the vertical shaft (11). The worm and wheel are of great precision (zero play). The servodrive gives 360,000 programmable positions, which increases its positional precision.

The rotary table (9) with vertical shaft will have successive positions between −N°, 0° and +N°, FIGS. 4a, 4b and 4c, adapting to the various holes to be drilled in the crankshafts. The 0° position corresponds to the holes (4), FIG. 7, at right angles to the longitudinal axis (2) of the crankshafts. The −N° and +N° positions correspond to the holes (3), FIG. 7, angled in one direction or another to the longitudinal axis (2) of the crankshafts on the horizontal plane.

The stations 2 and 3 for loading/unloading of crankshafts are static and situated at −90° and −180° respectively, FIGS. 4d and 4e.

In FIG. 5a, loading/unloading at station 3 is carried out while the rotary table (9) is static in the 0° position when drilling the holes (4) which are at right angles to the crankshafts' longitudinal axis (2).

In FIG. 5b, as this is a "mirror" cell, what happens in station 1 is repeated like a reflection in station 3.

On the surface (10) of the rotary table. (9) goes the squaring body (17), which on its front side (vertical) (18) includes the sub-unit (19), FIG. 6, which bears the crankshafts. FIGS. 1 and 6 show two crankshafts per cycle, a more balanced number and therefore preferable, and this is why this is the model for the plans and the description. However, depending on whether greater or lesser production is required, this invention is equally applicable for one or more than two crankshafts per cycle.

The sub-unit (19) contains the following elements:

A device to receive/adjust/support the crankshafts (1) and (1a), FIG. 6. The loading process, either manual or automatic, leaves them resting on supports (20) and (21). Next, the adjustments are carried out: one adjustment is axial (longitudinally), another centres its axis (radially) and the other is circumferential (angularly). The axial and centring adjustments use in common the movement of two hydraulic cylinders (22) and (23). The left-hand cylinder (22) has greater force than the right-hand one (23). Both have cone-shaped centring points (24) and (25) on the ends of their rising stems (26) and (27). The left-hand cylinder (22) pushes the crankshaft towards the right, against the axial reference (28) situated on the right-hand part of the crankshaft, and its greater force prevails against the lesser force of the right hand cylinder, both with their cone points inserted into the centres on the ends of the crankshaft. Thus axial and centring adjustment is achieved, as well as a partial and light axial support, partial because there is a complementary support which is described below, and light because it must not be too strong, otherwise the undesirable bending of a piece as flexible as a crankshaft will be produced. The light axial support force is equal to the difference of forces between the two opposing hydraulic cylinders (22) and (23). There remains the circumferential adjustment, based on the $1^{st}$ pin (29) of the right-hand end of the crankshaft. This pin (29) seats its diameter on the reference (30) that juts out to the left of the turn activator (31). Opposite this datum is the hydraulic cylinder (32) with redirection of forces at 90°, via two blocks (33) and (34), so that the thruster (35) exerts pressure on the diameter of the crankpin (29) against the datum (30). Two objectives are achieved here: Firstly, adjusting the crankshaft to the correct circumferential position and secondly, supporting, this time more firmly, because the direction of this force does not produce flexion. This support is complementary to the light axial direction support. The sum of the two supports is more than enough to resist drilling stresses. For the sake of simplicity, the above paragraph refers to just one crankshaft, but the plans and the rest of the general description refer to the pair of crankshafts previously mentioned. This is just to clarify that the duplication of the support and adjustment elements should be taken as read.

The left-hand hydraulic cylinders (22) (and their twin), with their pins (26) and cone-shaped centring points (24), are mounted on two supports (36) and (36a), and these are fixed to the front face (18) of the squaring body (17), FIG. 6, but they can be moved in the direction of the arrow (L) to adapt their position to crankshafts of different lengths. At all times the crankshafts (1), (1a) remain on a horizontal plane.

Device for obtaining different circumferential positionings when revolving the crankshafts (1) on their longitudinal axis (2). The result is a turn in the direction of the arrow (B), FIGS. 1, 2, 6, 7 and 8. FIG. 8 shows the servomotor (37) which via the coupling (38) and the shaft (39) transmits its revolution to the worm (40) which engages with the wheel (41), linked to the rotation activator (31), FIGS. 6 and 7, carrying the elements (30) and (35) with three functions: one to serve as a circumferential datum, another to serve as a complementary support, both described in the previous paragraph on this topic, and the third function, to rotate the crankshaft, by means of the fixed crankpin (29) and the rotating action provided by the servomotor (37). All this occurs in the crankshaft placed above and simultaneously and synchronously the same revolving action is repeated on the $2^{nd}$ crankshaft situated below, by means of duplicated elements: coupling (42), shaft (43) worm (44), wheel (45), rotation activator (46), etc. This layout is provided with a sensor (47) to determine the origin (homing) of these revolutions on the longitudinal axis (2) of the crankshafts (1), (1a).

The machining module (6), FIGS. 1, 2 and 3 comprises:

The X axis (horizontal-transverse) with base (48), on which the prismatic guides or rails (49) are situated, and on these run the linear rollers (50), joined to the module or mobile table (51), which moves as shown by arrow X. The servomotor (52), by means of a coupling activates the ball screw (53), on to the nut (54) joined to the module (51).

The Y axis (vertical), which on the front side of the column module (57) has the rails fixed (62), and on these run the linear rollers (63), joined to the module (64), which moves vertically as shown by arrow Y. The servomotor (65), by means of a coupling activates the ball screw (66), on to the nut (67) joined to the module (64).

The Z axis (horizontal and parallel to W) which on the front side of the module (64) of the Y axis has the rails fixed (68), and on these run the linear rollers (69), joined to the module (70), which moves as shown by arrow Z. The servomotor (71), by means of a coupling activates the ball screw (72), on to the nut (73) joined to the module (70).

The W axis (horizontal and parallel to the Z axis) whose base is the module (51) of the X axis. On the top of this module are the rails (55), and on these run the linear rollers (56), joined to the column module (57), which moves as shown by arrow W. The servomotor (58), by means of a coupling (59) activates the ball screw (60), on to the nut (61) joined to the column module (57).

This description shows that each of the four axes, X, Y, Z and W, acts independently, including Z and W, in spite of the displacements of these two being parallel. Although the action of the four axes are independent, the relative position of one slide unit with the others gives rise to selective pulling, suitable for the general functioning of the machine. When the X axis module moves, it pulls the parts making up the Y, Z and W axes, but when the latter axes modules move, they do not pull the X axis module. When the W axis module moves, it pulls the parts making up the Y and Z axes, but when the latter axes modules move, they do not pull the W axis module. When the Y axis module moves, it pulls the parts making up the Z axis, but when the Z axis module moves, it does not pull the Y axis module. The movement of the Z axis module which presents the tool for drilling does not affect any of the other axes, which remain static while drilling with Z. For a better understanding of the claims which follow, the Z axis is called the $1^{st}$ axis (horizontal), the X axis is called the $2^{nd}$ axis (horizontal), the Y axis is called the $3^{rd}$ axis (vertical) and the W axis is called the $4^{th}$ axis (horizontal). The Z axis is the tool presentation and penetration axis, the X and Y axes are the axes that position the module in the co-ordinates of each hole to be drilled and the W axis is the one that moves the sub-unit with the tool guide bushing and collecting bin for chips in the case of drilling with a gun drill.

On the external face of the Z axis module (70) goes the head (74) provided with two spindles (75) and (75a), each one activated by their respective spindle motor (76) and (76a), with speed governed by an electronic variator, to adapt the spindles' r.p.m. to the cutting speed of the tools in each case. Each spindle is provided with its corresponding tool-holder (77).

On the external face of the Y axis module (64) is fixed the sub-unit (78) carrying the conventional tool guide bushings. With the gun drill option, as well as carrying the bushings (79) it also carries the collecting bin (80) which collects the chips as well as the outlet pipe (81), FIGS. 1 and 2. The guide bushings are necessary to ensure that the high precision in positioning offered by the machine does not fail because of bending of the tools, particularly at the beginning of drilling on surfaces that are not flat but curved, which tend to deviate the tools at the crucial moment right at the start. This sub-unit (78), through being attached to the Y axis module, follows all the displacements of the X, Y and W axes, but the Z axis does not affect it, because when the Z axis moves, the sub-unit remains static. When this sub-unit (78) needs to approach the crankshafts, the W axis moves forwards. When the sub-unit (78) needs to be situated in different positions along the longitudinal axis of the crankshafts, the X axis moves. When it has to be situated in different positions widthways, the Y axis moves, which has a short run, not needing a longer run due to the reduced range of positioning widthways. The W and Z axes have longer runs which are similar to each other, to approach and withdraw from the crankshafts, and in the case of Z, to effect the drill penetration. The X axis has two functions, one to position itself along the longitudinal axis of the crankshafts and the other, complementary, function is to make use of the X axis for the automatic changing of tools and bushings, this second function causing the X run to be longer than if it only carried out the first function.

The tool magazine (7), FIGS. 2 and 3, can have various versions:

The simplest version, with a 4-station disc (82), each station containing the pair of elements to be exchanged (83) and (83a) at the same distance "d" as the gap between the two spindles (75) and 75a) of the machining modules. The disc is activated by a servomotor (85) which produces revolutions in the direction of the arrow (C), both ways. The disc is mounted on a column (86), fixed to the frame (8).

When there is a greater number of elements to be exchanged, the magazine is a chain magazine, with the shape that can be seen in FIG. 3a. The pair of elements to be exchanged (83) and (83a) is at the same distance "d" as the gap between the two spindles of the machining modules. But to make better use of the magazine, in this version other pairs (84) and (84a) are inserted in the intervening areas, also with the same distance "d" between them, but in relation to the preceding pair they are at half the distance "d/2". This supply line is also activated by a servomotor (85) for the revolving/displacement of the line. Similarly it is mounted on a column (86), fixed to the frame (8).

The automatic change simultaneously operates on the pair of spindles. Thus 2 tools+2 guide bushings are changed, or only two bushings when the next drilling is done with the same tool and only the bushings need to be changed because they have a different shape on their front end, to adapt that shape to the area of the crankshaft they are to rest on.

In either of the two supply versions, each section is provided with a clip which clips on to the element to be retained. In all cases the element is retained in its retention zone, and when the change involves tool +bushing, the tool is completely inserted into the spindle.

The sequence of automatic changing of tool and bushings is as follows (after completing the previous drilling):

Z moves forward to completely insert the tool into the spindles (79).

X moves to the supply (7). The movement is used to place the elements withdrawn from the two spindles (75) and (75a) into two empty spaces in the supply. These elements are held by clips.

The joint between each spindle (75) and (75a) and its respective tool-holder (77) is uncoupled, by the action of a hydraulic cylinder situated at the back of each spindle.

An additional move backwards by W. The tools and bushings remain clipped into the supply (7) once the sub-unit (78) has withdrawn.

The disc turns or the supply line (7) runs, presenting the next 2 tools+2 bushings or the 2 bushings (79).

W moves forward.

Coupling of each spindle and its corresponding tool-holder, through the action of the hydraulic cylinder.

The X axis moves towards the drilling area.

Z moves back to the position for the beginning of the next drilling.

The disc turns or the chain magazine runs presenting the empty compartments for the next change.

There now follows a description of the process or method for drilling oil holes in the crankshafts:

In the automatic or manual loading station a crankshaft is placed in the support unit, which has the two hydraulic cylinders withdrawn to facilitate the introduction of the crankshaft, and on moving them forwards, the adjustment and fixing is carried out.

The horizontally-faced rotary table with a vertical shaft turns until situating the device and the crankshaft in front of the drilling tool, in the right position for the first hole.

Simultaneously the adjoining device turns the crankshaft on its longitudinal axis, up to the circumferential position for the first hole to be drilled.

At the same time the X and Y axes move to position the machining module until the spindle is situated in the correct co-ordinates for the first hole to be drilled.

The fourth W axis of the machining module moves forward to place the sub-unit with the tool bushing in contact with or close by the crankshaft.

The Z axis moves forward and the tool penetrates the body of the crankshaft, drilling the first hole.

The Z axis withdraws, extracting the tool from the drilled hole.

The W axis withdraws, with its guide bushing.

The other holes are drilled in a similar manner, first those parallel to each other, avoiding some of the sequences if a positioning is the same. Then the holes which are unconformable with each other are drilled, making all the sequences necessary.

At the end of the general drilling cycle, the horizontally-faced rotary table with vertical shaft rotates to the station where the drilled crankshaft is unloaded and the next crankshaft is loaded.

The description of these sequences has been set out citing just one crankshaft, but they are valid for two or more crankshafts being drilled at the same time.

To these sequences others can be added if the change of tools and/or bushings is required, one by one or several, depending on whether one, two or more crankshafts are being drilled. The extra sequences would be those required by the automatic changing system included in the machine, as described in the corresponding section.

Although the title says " . . . for drilling oil-holes . . .", if required, after the drilling, the entrance to the holes can be chamfered, using chamfer tools, whose changing between the magazine and the spindle can be effected by the automatic change system included in the invention. It will be noticed that on the rotary table (9) with vertical rotating shaft (11) is mounted the squaring body (17), which forms a prismatic volume with an irregular horizontal base, and a front surface at right angles to the horizontal, and on this front surface are kept the crankshaft(s), with their longitudinal axis on horizontal plane(s) at all times.

What is claimed is:

1. A process for drilling oil-holes in a crankshaft at various positions lengthwise and widthwise about a longitudinal axis through the crankshaft with perpendicular and angled directions with regards to the longitudinal axis, said process comprising the following sequential steps:

(a) placing a crankshaft in a horizontal position in a crankshaft holding unit and maintaining said crankshaft in a horizontal position through the drilling process, said crankshaft holding unit positioned adjacent to a crankshaft drilling unit, said drilling unit having four independent axes of movement, a first axis which is horizontal and along which a drill tool moves into and out of penetrating engagement with the crankshaft, a second axis which is horizontal and along which the drill tool is moved in a lengthwise direction along the crankshaft, a third axis which is vertical and along which the drill tool is moved vertically, and a fourth axis which is horizontal and along which the drill tool is moved horizontally, parallel to the first axis;

(b) rotating said holding unit on a vertical axis until the crankshaft faces the drilling unit, said vertical axis taken through said holding unit and said vertical axis not intersecting said longitudinal axis of said crankshaft;

(c) rotating said crankshaft along the longitudinal axis of the crankshaft to position said crankshaft in position for drilling a hole;

(d) moving the drill tool on the second axis and the third axis until the drill tool is situated to drill the hole in the crankshaft;

(e) moving the drill tool on the fourth axis to move the drill tool into contact with or into close contact with the crankshaft;

(f) moving the drill tool on the first axis so as to cause said drill tool to penetrate said crankshaft and drill the hole in the crankshaft;

(g) moving the drill tool on the first axis so as to extract the drill tool from the hole;

(h) moving the drill tool on the fourth axis to move the drill tool out of contact with the crankshaft;

(i) repeating steps (c) through (h) so as to drill additional holes in said crankshaft;

(j) rotating said holding unit on said vertical axis until the crankshaft faces away from the drilling unit; and (k) unloading the crankshaft with holes drilled therein from the crankshaft holding unit.

2. The process of claim 1 wherein said crankshaft holding unit holds two crankshafts and the sequence of steps (a) through (k) are conducted for said two crankshafts.

3. The process of claim 1 wherein said crankshaft holding unit holds one or more crankshafts and the sequence of steps (a) through (k) are conducted for said one or more crankshafts.

4. The process of claim 1 wherein said process further comprises the step of changing over a drill tool in said crankshaft drilling unit for a replacement drill tool in a drill tool supply unit.

5. The process of claim 4 wherein said step of changing over a drill tool in said drilling unit for a replacement drill tool in said supply unit comprises the following steps:

i) moving the drill tool forward on the first axis;

ii) moving the drill tool on the second axis from a drilling area to the supply unit and into a vacant compartment in the supply unit;

iii) uncoupling the drill tool from a spindle which couples the drill tool to the drilling unit;

iv) moving the spindle on the fourth axis so as to withdraw the spindle from the drill tool;

v) rotating the supply unit to present the replacement drill tool to said spindle;

vi) moving said spindle on the fourth axis so that said spindle engages said replacement drill tool;

vii) coupling said replacement drill tool with said spindle;

viii) moving said replacement drill tool on the second axis to the drilling area;

ix) moving said replacement drill tool into position for drilling; and x) rotating said magazine to present another vacant compartment.

6. The method of claim 5 wherein said replacement drill tool is a chamfer tool.

* * * * *